United States Patent [19]

Coquin

[11] 4,381,885
[45] May 3, 1983

[54] DEVICE FOR HOLDING ACCESSORIES FOR THE LENSES OF APPARATUSES FOR TAKING PICTURES

[76] Inventor: Jean-Claude Coquin, 15, rue Jean Bologne, 75016 Paris, France

[21] Appl. No.: 18,883

[22] Filed: Mar. 9, 1979

[30] Foreign Application Priority Data

Mar. 14, 1978 [FR] France ................................ 78 07309

[51] Int. Cl.³ ............................................. G02B 7/00
[52] U.S. Cl. .................................................... 350/318
[58] Field of Search ............... 350/318, 316, 311, 257, 350/58

[56] References Cited

FOREIGN PATENT DOCUMENTS 473799 8/1952 Italy ...................................... 350/58
250083 8/1947 Switzerland ........................ 350/318
258866 12/1948 Switzerland .......................... 350/58

OTHER PUBLICATIONS

2-Page Brochure, Victor Hasselblad Aktiebolag, Goteborg, Sweden, 1975.

Primary Examiner—Jon W. Henry
Attorney, Agent, or Firm—Cushman, Darby & Cushman

[57] ABSTRACT

A device for holding accessories for optical devices such as cameras is comprised of an annular body rotatably connectable to the optical device by an intermediate mounting element with an annular sleeve for mounting in a recess of the annular body. The opposite side of the annular body has recesses for mounting photographic accessories such as filters.

11 Claims, 7 Drawing Figures

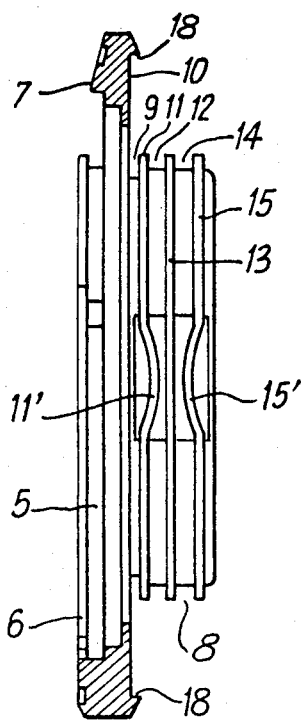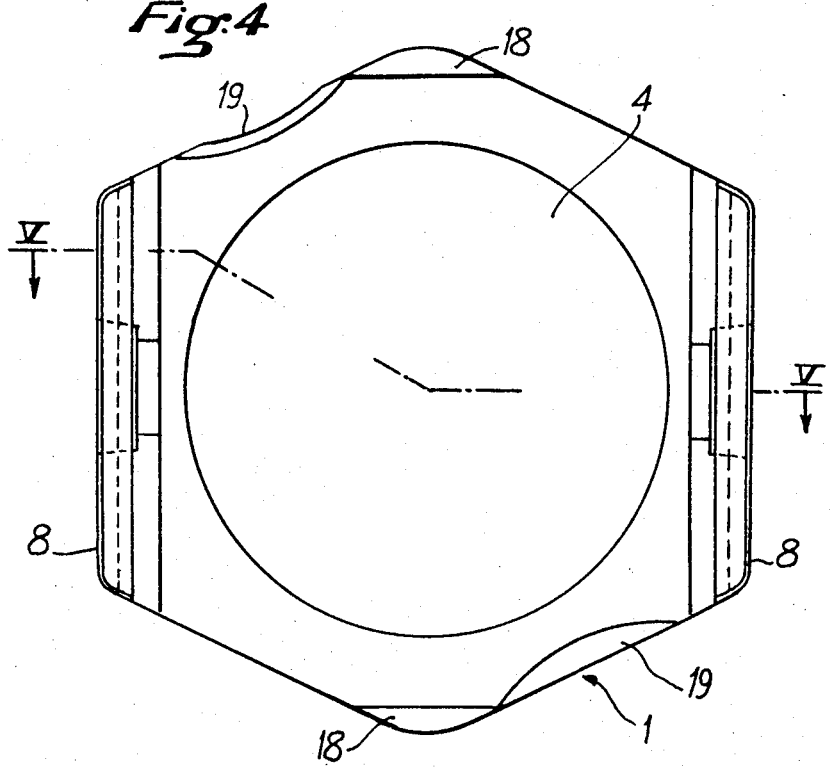

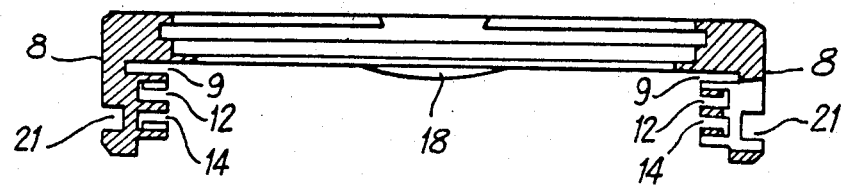
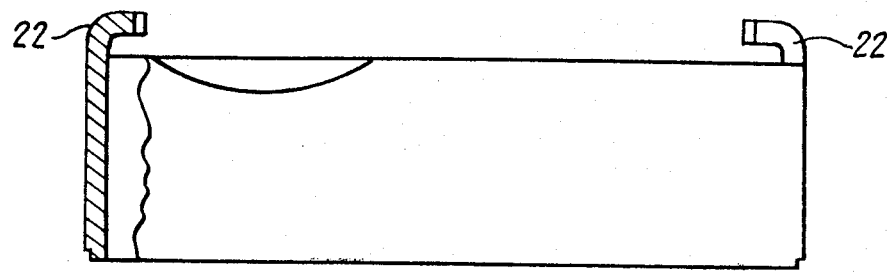
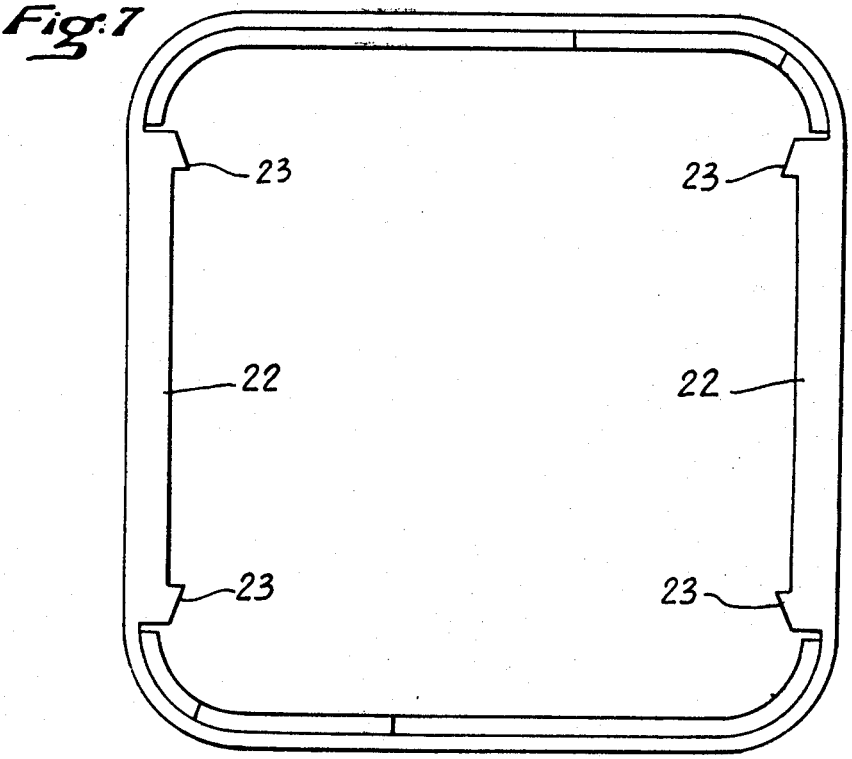

DEVICE FOR HOLDING ACCESSORIES FOR THE LENSES OF APPARATUSES FOR TAKING PICTURES

The present invention relates to a device for holding accessories, especially filter holders for an apparatus for taking photographs. For simplicity, such apparatus is referred to hereinafter as a camera.

BACKGROUND OF THE INVENTION

It is often necessary, when taking photographs, to place one or more filters in front of the lens, and particularly a polarizing, revolving filter, and/or one or more colored filters, as well as a supplementary element such as a sunshade.

Taking into consideration the differences in diameter of the lenses of the numerous types of cameras which are available commercially, it is necessary, at present, for the manufacturers of photographic accessories such as filters, in particular, to provide themselves in advance with the entire range of filters necessary for each of the possible lens diameters.

This increases the cost of manufacturing these accessories considerably and makes it obligatory for the manufacturers, wholesalers and retailers all to maintain a large stock made up of a very large number of different pieces in order to be able to take care of the needs of the customers.

It is the intention of the present invention to provide a device for holding accessories which is easily adaptable to all the diameters of lenses used commercially, which will be simple and economical and which will make it possible to receive various accessories, such as filters, in particular, and a sunshade, while permitting the necessary relative movements of rotation and/or sliding in translation, of the filters in relation to the lens.

BRIEF DESCRIPTION OF THE INVENTION

The object of the present invention, as a new industrial product, is to provide a device for holding accessories for a camera or the like comprising an annular body, an intermediate mounting element for mounting the body on the lens of the apparatus for taking photographs, the mounting element including an annular sleeve provided with external threading for screwing it onto the lens of the camera, the body having on one side a recess for receiving the edge of the sleeve in such a way as to permit relative rotation of the body about its axis in relation to the lens, the body also having at least one pair of grooves, on its side which is opposite the recess for the sleeve, for receiving a photographic accessory, particularly a filter.

In a preferred embodiment, the grooves are made in two approximately parallel and opposing side plates or flanges which are offset to the outside and which extend perpendicularly to the body.

Preferably, there are two pairs of grooves and the grooves of one of the pairs are arranged facing each other in the internal faces of the opposing side plates in such a way as to permit the reception between them of a filter of a circular shape, such as a polarizing filter, while permitting the relative rotation of that filter in relation to the body, with the latter also advantageously including lateral stops which prevent the disengagement of the rotatable filter from the body.

Each of the two opposing side plates has, in its internal face, in addition to the groove for receiving the rotatable circular filter, at least one groove, and preferably two grooves, for receiving, between the grooves facing the two side plates, a flat, conventional filter. The arrangement is such as to permit a sliding displacement of the flat filter or filters in relation to the body. At least one of the sides of each of these grooves can advantageously have a certain resilience in order to releasably hold the filter in the corresponding grooves.

The grooves in the internal faces of the side plates are advantageously arranged so that the holder can receive, simultaneously, a rotatable circular filter and a sliding flat filter, or two sliding flat filters. In this way, in all cases, one obtains three possibilities of relative movement—that is, in the first case one obtains the rotation of the body in relation to the lens, the rotation of the circular filter in relation to the body and the sliding of the flat filter in relation to the body; and in the second case one obtains the rotation of the body in relation to the lens and the two possible movements of sliding in translation of the flat filters in relation to the body.

In one particular embodiment, the external faces of the opposing side plates of the body each include a groove for the slidable engagement of corresponding connecting tongues of a sunshade which can be mounted on the holder.

The body of the holder may have an approximately pentagonal shape with a circular, central aperture, while the side plates, including the grooves for receiving the accessories, are arranged along two opposing sides of the hexagonal body. Certain sides of the body can advantageously have bevelled edges or hollows which permit, in particular, a finger to gain access to the outer edge of the circular filter in order to turn the filter relative to the body.

The annular, intermediate mounting sleeve advantageously has an internal flange, threaded on the outside, protruding radially from the said sleeve. In this embodiment, the recess of the body for receiving the mounting sleeve takes the form of an annular groove extending around the major portion of the circular aperture of the body and has dimensions corresponding to the external diameter of the sleeve, with a stop also being provided to immobilize the sleeve laterally in its recess while permitting rotation of the sleeve relative to the body. The engagement of the sleeve behind the stop and its extraction are accomplished by slightly deforming the resilient material of which the body is made.

With such a construction an embodiment, and with a single body, it is possible to provide in advance a set of such mounting sleeves in which the external diameter of each one is identical and corresponds to the dimensions of the recess, and in which the diameter of the threaded internal flange of each one corresponds to every lens dimension that is commercially available. It will be understood that it is possible to adapt the holder to all lens diameters by a simple alteration of the mounting sleeve.

BRIEF DESCRIPTION OF THE DRAWINGS

Other advantages and characteristics of the invention will become apparent from reading the following description, which is provided in the form of a nonlimiting, specific embodiment of the device of the invention, and including references to the annexed drawings, in which:

FIG. 3 is a cross section along the line III—III of FIG. 2.

FIG. 4 is a view in elevation of the body of the device seen from the side opposite that which is mounted on the lens.

FIG. 5 is a cross section along the line V—V of FIG. 4.

FIG. 6 is an end view, partially in section, of a sunshade which can be used with the device of the invention.

FIG. 7 is a frontal view in elevation of the sunshade represented in FIG. 6.

DETAILED DESCRIPTION

Figure 1:
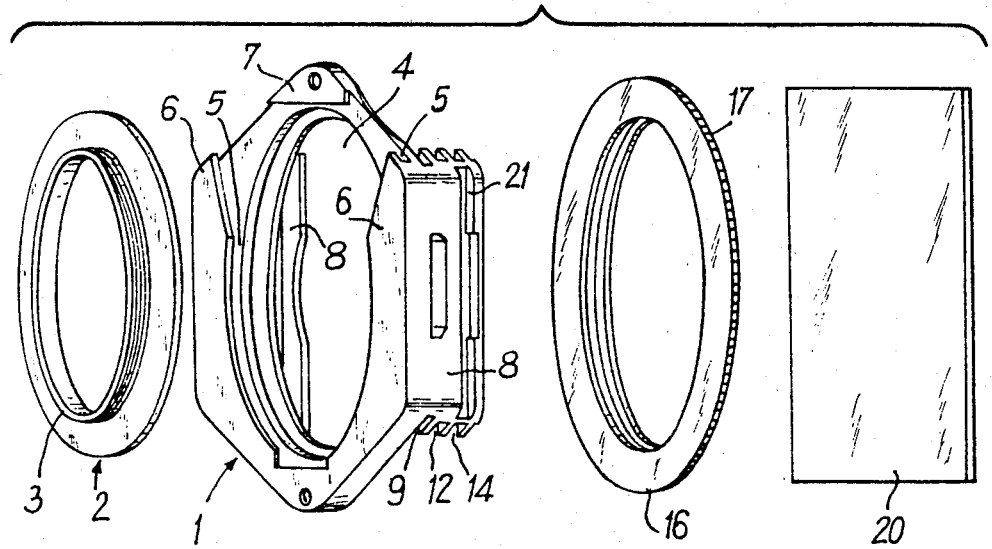
FIG. 1 is an exploded view in perspective of the device of the invention, together with a rotatable filter and a flat filter.

The device or holder of the invention includes an annular body 1 of slight thickness and, in the illustrated embodiment, having an approximately hexagonal shape with rounded-off corners, and of an intermediate mounting sleeve 2.

The intermediate sleeve 2 for mounting the body 1 on a lens of a camera includes a radial, annular flange 3 which surrounds a central aperture and which can be screwed onto the threads which camera lenses conventionally have.

The body 1, which is preferably made from a single support by casting, has a circular, central aperture 4 and a groove 5 in an exterior wall 6 which forms one of the faces of the body 1. The groove 5 is annular in shape and extends around the major portion of the aperture 4. The sleeve 2 is insertable in the groove 5 so that the apertures in the sleeve 2 and the body 1 coincide.

Figure 2:
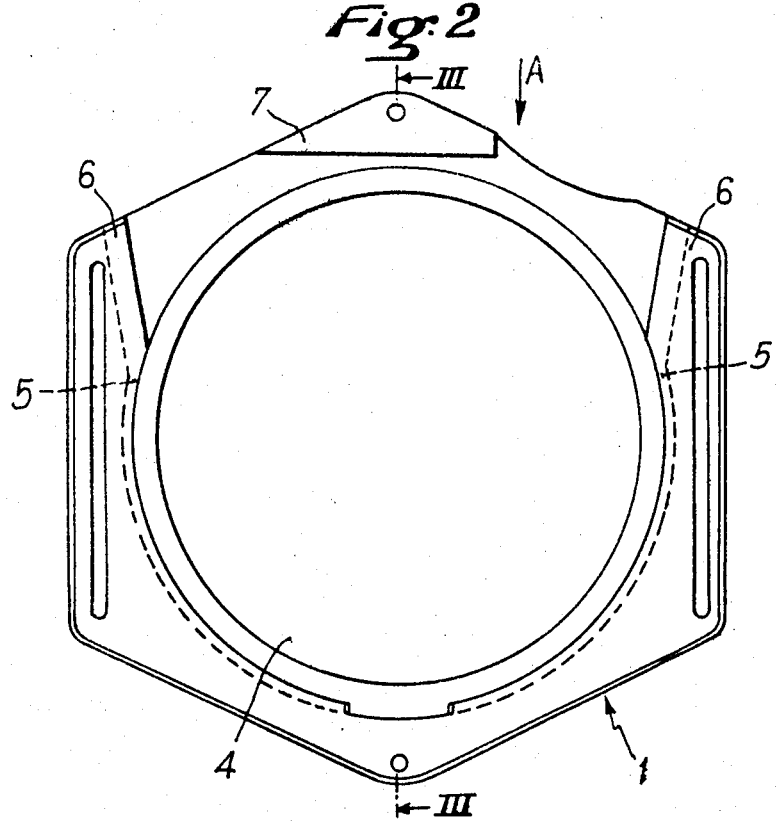
FIG. 2 is a view in elevation of the body of the device seen from the side that is mounted on the lens.

The body 1 includes, in the area where the intermediate mounting sleeve 2 is introduced into the groove 5, a stop 7 which is approximately triangular in shape and which is intended to keep the mounting sleeve 2 in the groove 5 of the body. In order to place the mounting sleeve 2 in the recess in the body defined by the annular groove 5, one introduces the sleeve 2 by making it slide in the direction indicated by the arrow A in FIG. 2 until it falls in place behind the stop 7, with the respective dimensions of the groove 5 and of the annular intermediate sleeve 2 being such that once the sleeve 2 is lodged in the groove 5, rotation of the sleeve 2 relative to the body 1 is possible. The groove 5 extends over a little more than a semicircle in such a way as to keep the intermediate sleeve 2 in position resiliently.

The body 1 of the holder also includes two parallel side plates 8 opposing each other on the face of the body 1 opposite the face which provides the groove 5. Each of the side plates 8 has a number of grooves on its internal face, three of them in the example shown, the grooves being formed between spaced apart ribs of the side plates 8. Thus, each side plate 8 has a groove 9 defined between a wall 10 of the body 1 and a rib 11, a second groove 12 defined between the rib 11 and a rib 13 and a third groove 14 defined between the rib 13 and a rib 15.

As can be seen from the drawings, the groove 9 in each of the plates 8 is finer and deeper than the grooves 12 and 14. The groove 9 is intended to receive a circular filter 16 as seen in FIG. 1. The filter 16 includes a peripheral ring which may be made of metal and knurled on its edge 17.

The circular filter 16 is inserted laterally in the body 1, engaging in the groove 9 until it comes between two lateral stops 18, with the arrangement being such that the filter 16 after insertion can rotate about its axis, in relation to the body 1. It is advantageous, for this purpose, for the body 1 to have recesses 19 in order to enable a finger to reach the knurled ring of the filter 16.

In addition to a rotatable filter 16, the holder can receive a flat filter 20 which can be totally or partially colored filter and formed in a rectangular shape. The filter 20 is capable of being engaged by sliding into the groove 14 located between the ribs 13 and 15. In order to make it possible to keep the flat filter 20 in the groove 14 by elasticity, it is advantageous for the central part 15' of the rib 15 to be curved in the direction of the rib 13.

If one does not put a rotatable filter in place, it is possible to install a second filter in the groove 12 in addition to a flat filter in the groove 14. The second filter will also be held resiliently by the curved central part 11' of the rib 11.

It will be understood that the flat filter or filters installed in the holder can slide in translation, at will, being lodged in the corresponding grooves 12 and 14, respectively, of the two side plates 8.

It is advantageous for each of these side plates 8 to have a radially outwardly facing groove 21 in its external face which will permit the slidable insertion of a supplementary element, such as a sunshade, as represented in FIGS. 6 and 7, for example. It is advantageous for this sunshade to take the form of a hollow housing with an approximately square shape and rounded edges and to have, offset toward the interior, starting at its rear face, two curved tongues 22 which can slidably engage into the grooves 21 of the side plates 8. The tongues 22 can have nose-pieces 23 at their ends to permit the immobilization of the sunshade on the body 1.

It will be understood that the holder makes it possible, by selecting a suitable mounting sleeve, to put a set of accessories in place on any lens of a camera. Thus, one can simultaneously install a rotatable filter, a flat filter and a sunshade, or else two flat filters and a sunshade.

It is evident, of course, that the device can be adjusted to receive other accessories without departing thereby either from the scope or the spirit of the invention.

The body 1 of the holder is preferably made by casting it from a plastic material which is capable of imparting a certain resilience or elasticity to the body for ease in installing and removing the mounting sleeve and the rotatable filter. The plastic material known by the trade name of "Delrin" may be used but this is not critical to the invention.

What is claimed is:

1. A device for holding accessories on an apparatus for taking photographs comprising an annular body, an intermediate mounting element for mounting the body on the lens of the apparatus for taking photographs, said mounting element including a removable annular sleeve provided with external threading for screwing it onto the lens, said body having on one side a recess for receiving the edge of said sleeve in such a way as to permit a relative movement of rotation of the said body in relation to the said lens, said body also having at least one pair of grooves, on its side which is opposite the recess for said sleeve, for receiving the edge of a photographic accessory.

2. A device as in claim 1, wherein said body has two approximately parallel, opposed side plates offset to the outside, perpendicularly to the said body and wherein said grooves are provided in said body.

3. A device as in claim 1 or claim 2, wherein there are two pairs of grooves and wherein the grooves of one of said pairs are arranged facing each other in the internal faces of the opposing side plates in such a way as to permit the reception between them of a filter of a circular shape, while permitting the relative rotation of that filter about its axis in relation to said body, with the latter also including lateral stops which prevent the disengagement of the circular filter from the body.

4. A device as in claim 3, wherein each of the two opposing side plates has, in its internal face, in addition to the groove for receiving the turning circular filter, at least one groove for receiving a flat filter between the grooves facing the two side plates, while permitting a sliding displacement of the flat filter in relation to the said body.

5. A device as in claim 4, wherein at least one of the sides of the groove for receiving a flat filter is resilient in order to permit maintenance of the filter in the groove.

6. A device as in claim 2, wherein the body has an approximately hexagonal shape with a circular, central aperture and wherein the side plates, including the grooves for receiving accessories, are arranged along two opposing sides of the hexagonal body.

7. A device as in claim 1 or 2, wherein said annular mounting sleeve has an internal flange, threaded on the outside, protruding from the said sleeve.

8. A device as in claim 7, wherein the recess in the body for receiving the mounting sleeve has the form of an annular groove extending around the major portion of the circular aperture of the body and has dimensions corresponding to the external diameter of the sleeve, with a stop also being provided to immobilize the sleeve laterally in its recess while permitting a relative rotation between the sleeve and the body.

9. A device as in claim 1 or 2, wherein there are a plurality of mounting elements, each of which includes an annular sleeve of the same external diameter and whose internal flanges threaded on the outside have different diameters.

10. A device as in claim 2, including a supplementary element having tongues and wherein the external faces of the opposing side plates each have a groove for the slidable engagement of the tongues of the supplementary element.

11. A sunshade for use with the device of claim 10, comprising a hollow housing having a pair of connecting tongues which can engage in one of the said pairs of grooves.

* * * * *